(12) United States Patent
Carpenter

(10) Patent No.: US 7,726,071 B2
(45) Date of Patent: Jun. 1, 2010

(54) VEGETATION ROOFING SYSTEM

(75) Inventor: Mark M. Carpenter, Tualatin, OR (US)

(73) Assignee: Columbia Green Technologies, Inc., Tualatin, OR (US)

( * ) Notice: Subject to any disclaimer, the term of this patent is extended or adjusted under 35 U.S.C. 154(b) by 40 days.

(21) Appl. No.: 12/135,726

(22) Filed: Jun. 9, 2008

(65) Prior Publication Data

US 2008/0236041 A1  Oct. 2, 2008

Related U.S. Application Data

(63) Continuation-in-part of application No. 11/621,294, filed on Jan. 9, 2007, now Pat. No. 7,603,808.

(60) Provisional application No. 61/027,391, filed on Feb. 8, 2008, provisional application No. 60/757,768, filed on Jan. 9, 2006.

(51) Int. Cl.
*A01G 9/02* (2006.01)
*A47G 19/00* (2006.01)
(52) U.S. Cl. ...................................... 47/65.9
(58) Field of Classification Search ............... 47/65.5, 47/66.1, 86, 65.9, 65.6, 67, 85
See application file for complete search history.

(56) References Cited

U.S. PATENT DOCUMENTS

| | | | |
|---|---|---|---|
| 986,395 A * | 3/1911 | King | 47/33 |
| 1,996,898 A | 4/1935 | Brandell | |
| 3,683,549 A | 8/1972 | Simmon | |
| 4,118,892 A | 10/1978 | Nakamura et al. | |
| 4,120,119 A * | 10/1978 | Engel | 47/66.1 |
| 4,926,586 A | 5/1990 | Nagamatsu | |
| 4,999,946 A | 3/1991 | DeGiglio et al. | |
| 5,595,021 A | 1/1997 | Ripley, Sr. et al. | |
| 5,664,367 A | 9/1997 | Huang | |
| 5,740,633 A | 4/1998 | Champagne | |
| 6,253,487 B1 * | 7/2001 | Yoshida et al. | 47/33 |
| 6,606,823 B1 * | 8/2003 | McDonough et al. | 47/65.9 |
| 6,694,672 B1 * | 2/2004 | Hergeth | 47/65.9 |

(Continued)

FOREIGN PATENT DOCUMENTS

DE  4029519 A1  3/1992
FR  2567361 A1  1/1986

OTHER PUBLICATIONS

Tectagreen, greenroof applicators, www.greenroof.com, 2006, TectaGreen.

(Continued)

*Primary Examiner*—Rob Swiatek
*Assistant Examiner*—Kristen C Hayes
(74) *Attorney, Agent, or Firm*—Marger Johnson & McCollom, P.C.

(57) ABSTRACT

A vegetation roofing tray comprising an interconnecting lip is provided. The interconnecting lip on the sidewall of a tray engages with a sidewall of an adjacent tray, securely interconnecting the adjacent trays side-by-side together. A securing device penetrating the sidewalls of adjacent trays may also be used to secure the adjacent trays together. A vegetation roofing system is also provided. The system includes two or more trays and an irrigation hose disposed across the trays.

16 Claims, 18 Drawing Sheets

U.S. PATENT DOCUMENTS

| | | | |
|---|---|---|---|
| 6,711,851 B2 | 3/2004 | Mischo | |
| 6,862,842 B2 | 3/2005 | Mischo | |
| 2002/0007592 A1* | 1/2002 | Mischo | 47/65.9 |
| 2002/0007593 A1* | 1/2002 | Mischo | 47/86 |
| 2007/0094927 A1* | 5/2007 | Perry | 47/65.9 |

OTHER PUBLICATIONS

U.S. Department of Energy, Federal Technology Alert Publication DOE/EE-0298, Sep. 2004, citing Dürr, A., Roof Greening: An Ecological Balance (1995).

* cited by examiner

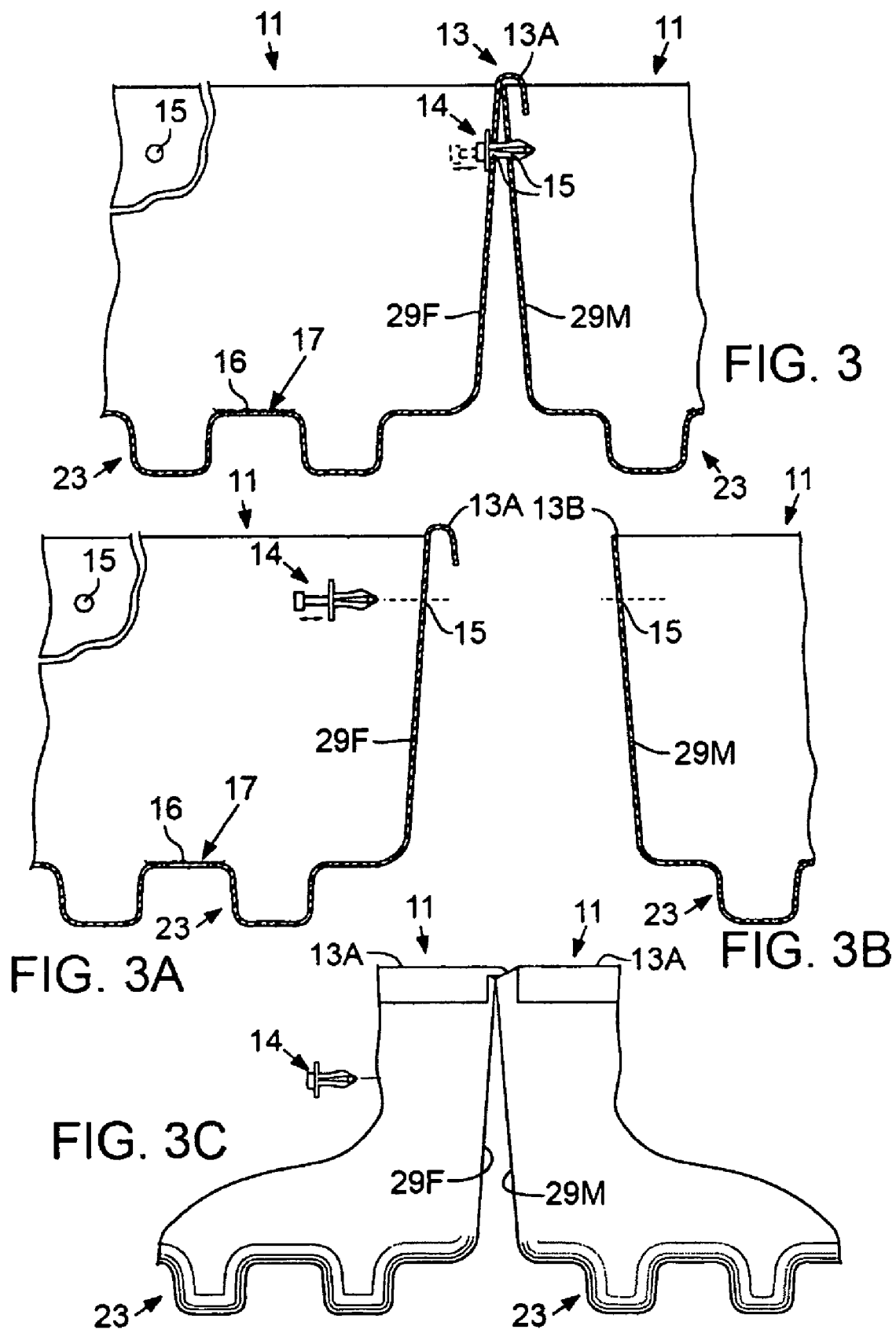

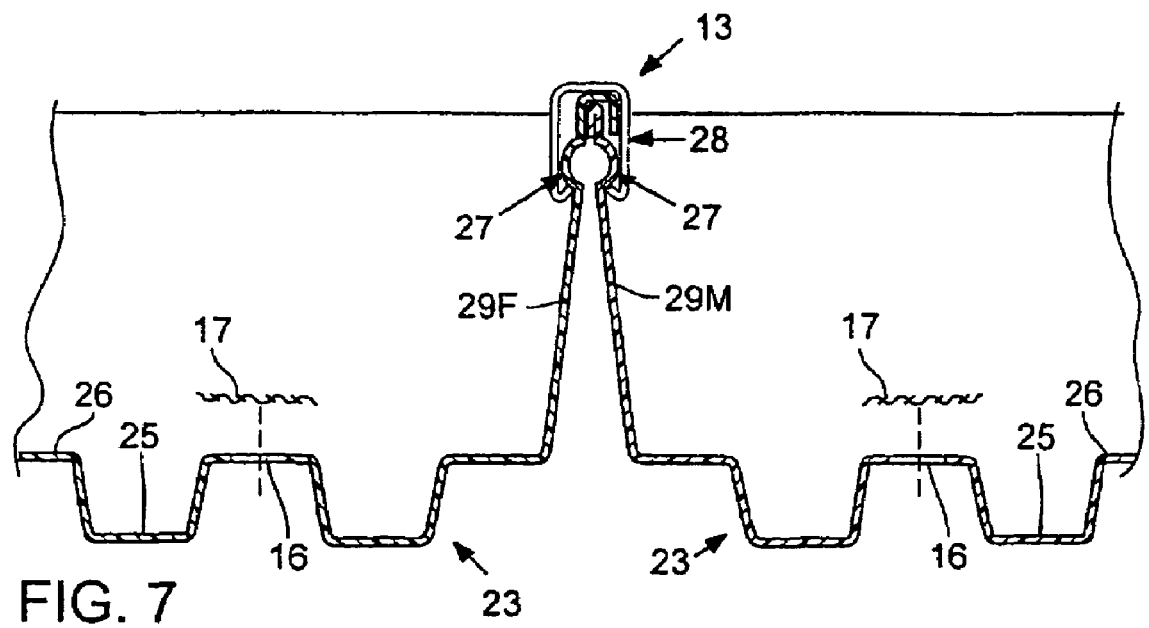
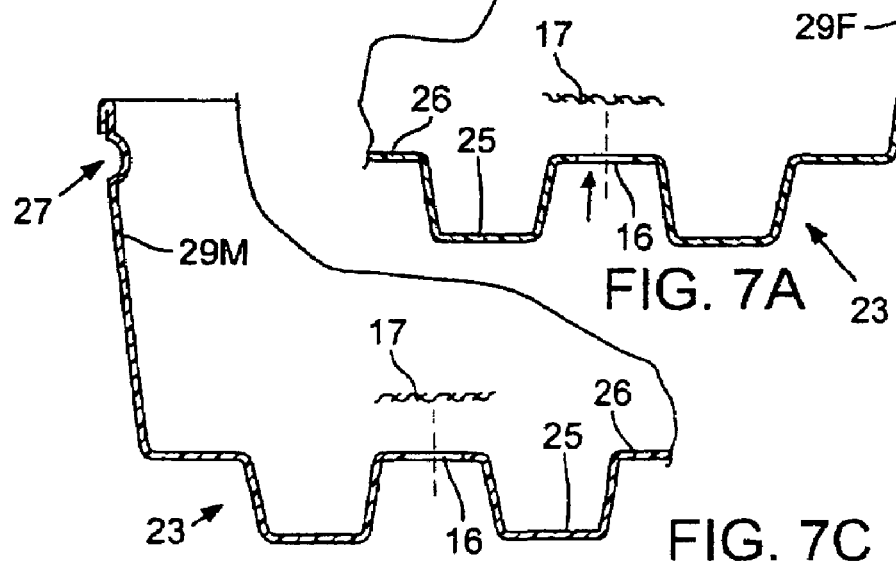

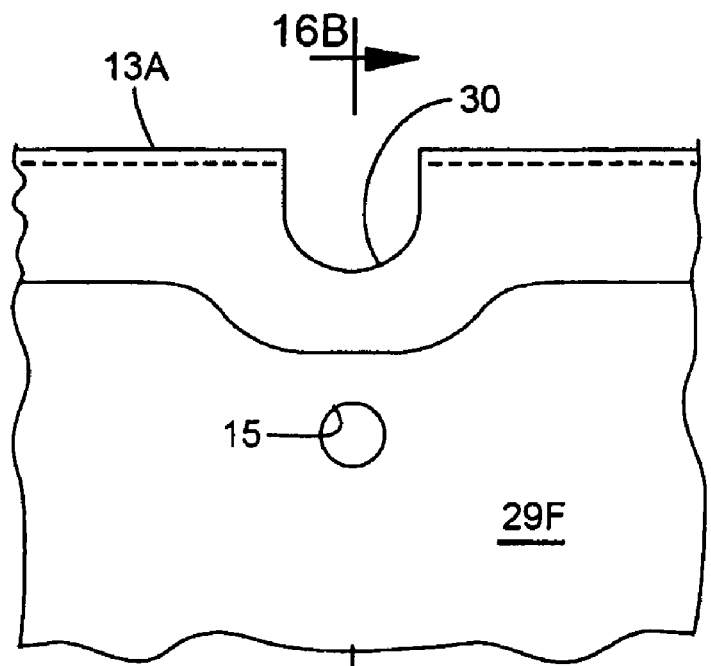 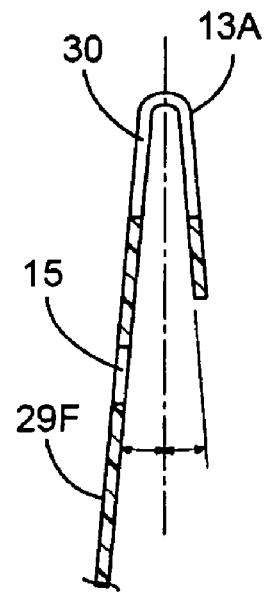
FIG. 16A  FIG. 16B
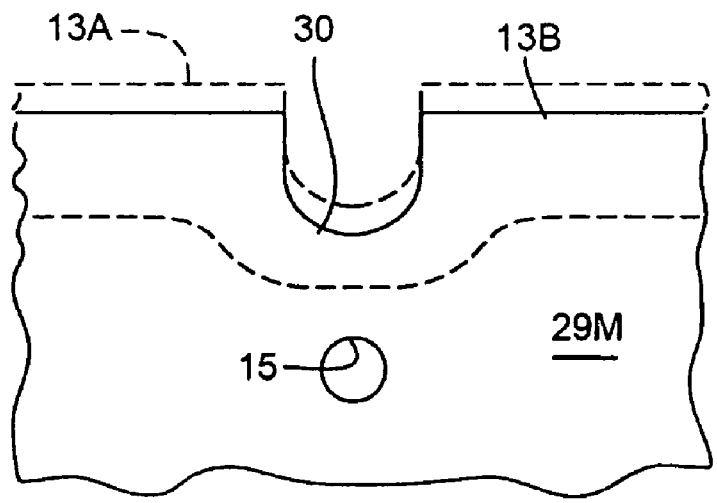 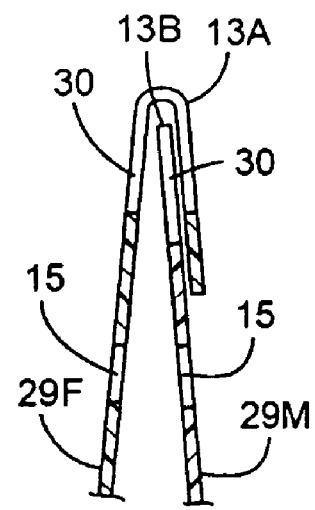
FIG. 17A  FIG. 17B

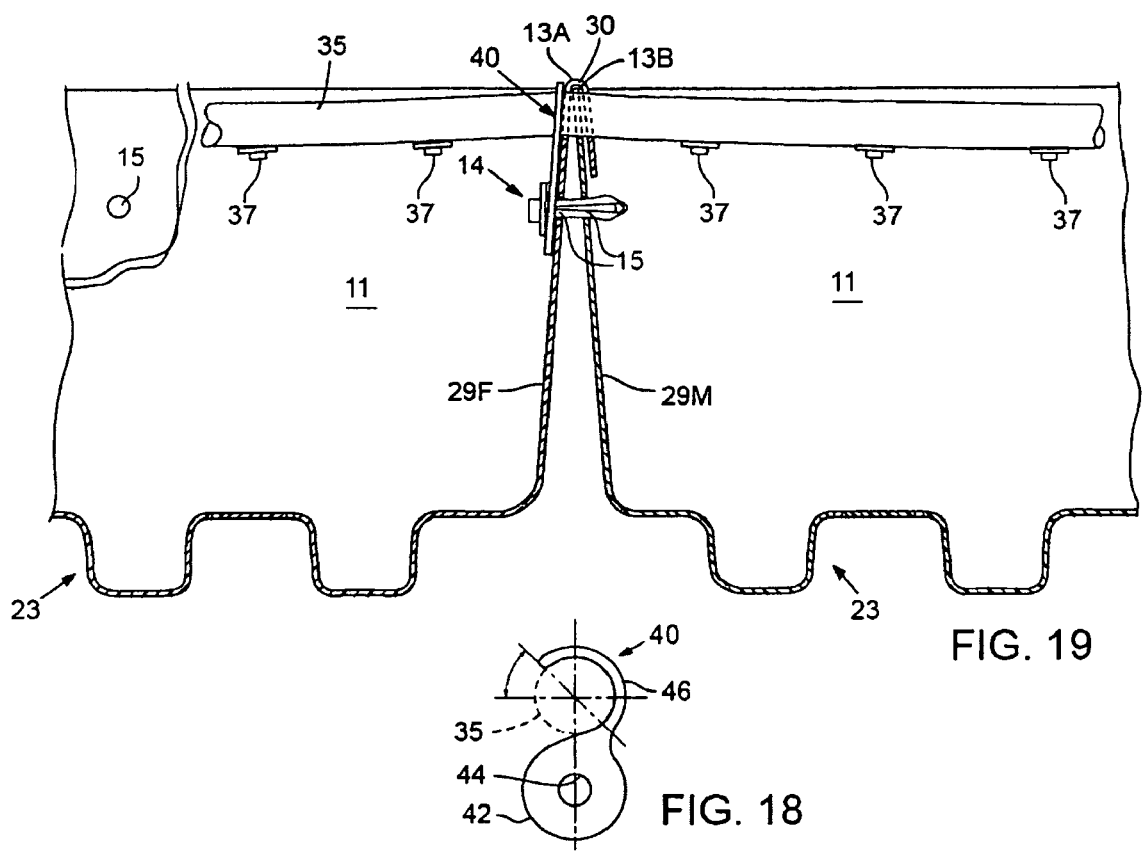

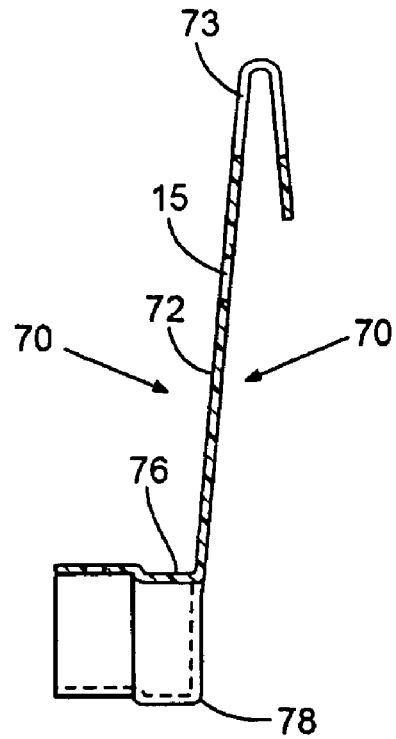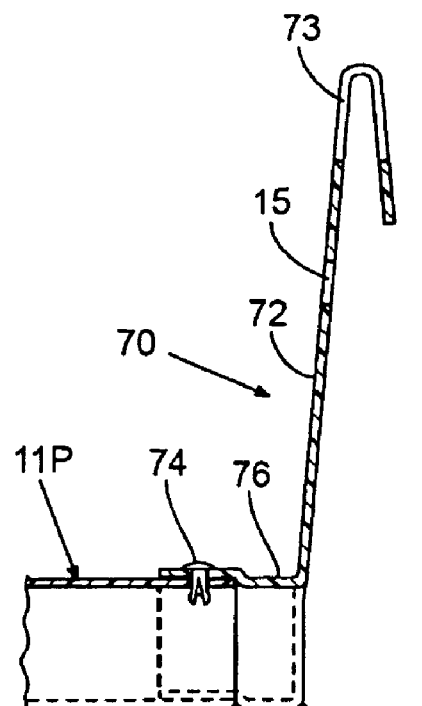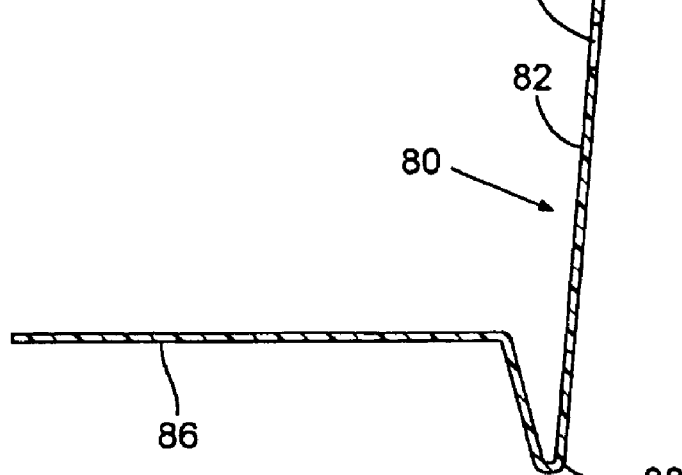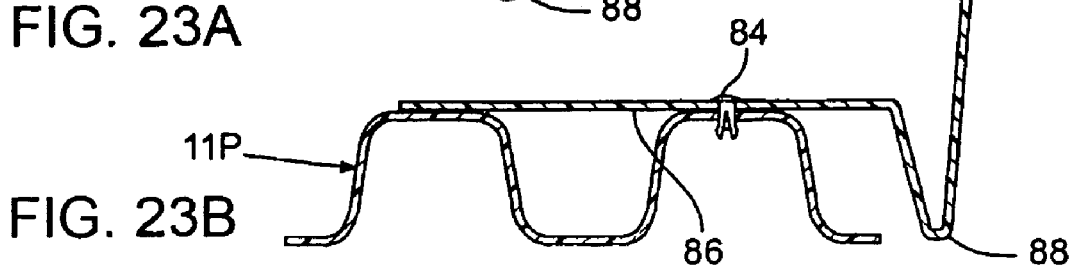
FIG. 22A
FIG. 22B
FIG. 23A
FIG. 23B

> US 7,726,071 B2

VEGETATION ROOFING SYSTEM

RELATED APPLICATION DATA

This application claims the benefit of U.S. Provisional application Ser. No. 61/027,391, filed Feb. 8, 2008, and is a continuation-in-part of U.S. patent application Ser. No. 11/621,294, filed Jan. 9, 2007 now U.S. Pat. No. 7,603,808, which claimed the benefit of U.S. Provisional application Ser. No. 60/757,768, filed Jan. 9, 2006, the contents of which are herein incorporated by reference in their entirety.

BACKGROUND

1. Technical Field

The invention relates generally to the field of roof coverings. Specifically, the invention relates to a modular system for providing storm water management and roof-protective vegetation on roof tops.

2. Description of the Related Art

The type of roof covering that is used on a building or dwelling can have a dramatic impact on the living conditions inside. As an example, roof coverings that provide significant solar energy collection can reduce the amount of heat energy transmitted into the living area of a building, which can lead to reduced energy costs (costs associated with cooling the living area) during hot periods. One type of roof covering that has received significant interest recently is a so-called 'green roof' system. Green roof systems typically incorporate some type of vegetation in a roof covering. Green roof systems can lead to reduced energy costs, due to the insulating effects of the vegetation, reduced storm-water runoff, due to the water-absorbing nature of the vegetation and accompanying soil, and environmental advantages, due to increased green space in commercial or other populated areas.

One prior art roof covering is disclosed in U.S. Pat. No. 6,606,823 to McDonough et al (hereinafter "McDonough"). McDonough provides a roof covering system consisting of modular trays that may be used to hold vegetation, absorbent material, or solar cells. The trays in McDonough require several layers of different materials as well as some type of ballast to weigh down the trays. Further, the McDonough trays have a complicated and expensive puzzle-type interlocking frame which leaves a gap between adjacent trays. These gaps represent un-captured roof area that does not realize the benefits of the green roof system. Also, the gaps between the trays allow soil mixture to spill out of the trays and onto the frame between the trays. This spilled soil mixture can lead to water pooling underneath the roofing system and subsequent damage to the roof below the roofing system. Consequently, a roofing system that does not have gaps between adjacent trays and does not require many layers of materials is desired.

Another prior art system is disclosed in U.S. Pat. No. 6,862,842 to Mischo (hereinafter "Mischo"). Mischo provides a modular green roof system that consists of pre-seeded panels that have edge flanges for connection purposes. The flanges of adjacent trays laterally abut or rest on top of each other and must be screwed or bolted together in order to secure the adjacent trays. The edge flanges space the trays apart. These screw or bolt type connections can add significant time and expense to the installation of the Mischo system. Consequently, a roofing system that does not require screwed or bolted connections between adjacent trays is also desired. It is also desired to maximize coverage of the roof by the trays.

The invention addresses these and other disadvantages of conventional roofing systems.

SUMMARY

The disclosure provides a tray for a green roof system and a green roof system utilizing the tray. The tray includes a connecting lip to allow adjacent trays to be secured side-by-side together. The tray also includes a securing device that penetrates the sidewalls of the tray, thereby providing a double locking system.

BRIEF DESCRIPTION OF THE DRAWINGS

The above and other objects, features and advantages of the disclosure will be more clearly understood from the following detailed description taken in conjunction with the accompanying drawings, in which:

FIGS. 3 and 3A-B are cross-sectional views and FIG. 3C is an end view of a method for connecting trays of a green roof system according to an embodiment of the invention;

FIGS. 7 and 7A-C are cross-sectional views illustrating trays connected together according to an embodiment of the invention;

FIGS. 16A and 16B are plan and cross-sectional views, respectively, of a hose gap according to some embodiments of the invention.

FIGS. 17A and 17B are plan and cross-sectional views, respectively, of adjacent trays according to some embodiments of the invention.

FIG. 18 is a plan view of a hose retaining hook according to some embodiments of the invention.

FIGS. 19 and 20 are mutually orthogonal cross-sectional views of two joined trays according to some embodiments of the invention.

FIGS. 22A and 22B are cross-sectional views of perpendicular end caps according to some embodiments of the invention.

FIGS. 23A and 23B are cross-sectional views of parallel end caps according to some embodiments of the invention.

DETAILED DESCRIPTION OF PREFERRED EMBODIMENTS

Figure 1:
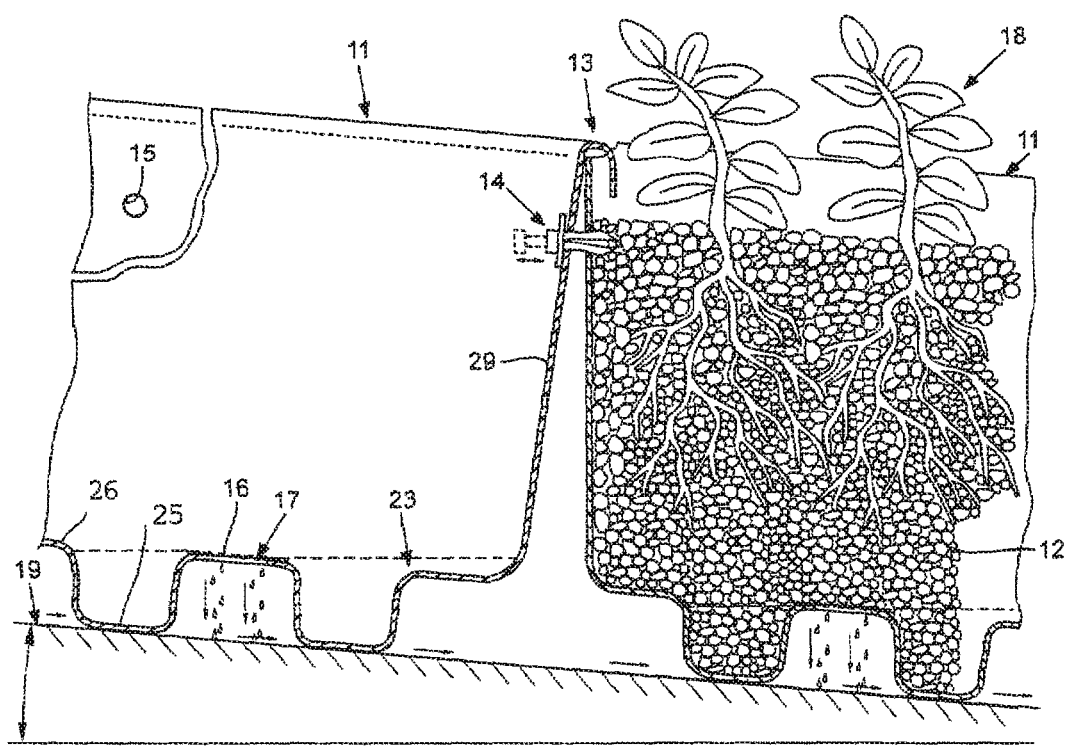
FIG. 1 is a cross-sectional view of a green roof system in accordance with some embodiments of the invention.

Example embodiments are described below with reference to the accompanying drawings. Many different forms and embodiments are possible without deviating from the spirit and teachings of this disclosure and so the disclosure should not be construed as limited to the example embodiments set forth herein. Rather, these example embodiments are provided so that this disclosure will be thorough and complete, and will fully convey the scope of the disclosure to those skilled in the art. In the drawings, the sizes and relative sizes of layers and regions may be exaggerated for clarity.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, region, layer or section. Thus, a first element, component, region, layer or section discussed below could be termed a second element, component, region, layer or section without departing from the teachings of the disclosure.

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, elements, and/or components, but do not preclude the presence or addition of one or more other features, elements, components, and/or groups thereof.

Unless otherwise defined, all terms (including technical and scientific terms) used herein have the same meaning as commonly understood by one skilled in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a cross-sectional view of a green roof system in accordance with some embodiments of the invention.

Referring to FIG. 1, a green roof system comprises a plurality of trays 11 disposed on a roof surface 19. The trays 11 contain an absorbent medium 12 and may contain vegetation 18. The trays are connected together along their adjoining edges by a connecting lip 13 and are held firmly together by a securing device 14. The securing device 14 may penetrate connecting holes 15 in vertical sidewalls of the trays 11. As shown in FIG. 1, excess water that is not absorbed by the absorbent medium 12 may leave the trays 11 through drain holes 16 (see FIG. 4).

The trays 11 may be approximately square-shaped having four flat side panels or sidewalls 29 and a corrugated bottom wall 23. The trays 11 may be semi-gloss black or green in color. The trays 11 may be composed of partially recycled 100 mil polypropylene. In this case, approximately 25% of each tray 11 may be made from recycled polypropylene resin. Alternatively, the trays 11 may be composed of 75 to 150 (preferably 100) mil polyethylene, approximately 25% of which may be recycled post industrial polyethylene. The trays 11 may be manufactured by a vacuum forming technique. Alternatively, the trays 11 may be manufactured by an injection molding process. The vertical side panels 29 of each tray 11 may have a 5 degree draft or slope to enhance drainage. The trays 11 may have a standard depth of approximately 4⅝".

The absorbent medium 12 may comprise both a soil mix and an absorbent material. The soil mix may be an engineered, light-weight blend consisting of inorganic and organic components. The absorbent material may be a super-absorbent water additive. As an example, ZEBA® from Absorbent Technologies, Inc. may be used as the absorbent material.

The vegetation 18 may be any type of plant that is suitable for the roof-top environment in the local climate. For example, the vegetation may be a design mixture of fibrous succulents that can thrive in a non-irrigated, extensive rooftop environment. The vegetation 18 may be selected based upon its USDA hardiness zone classification and local rainfall conditions.

Figure 2A:
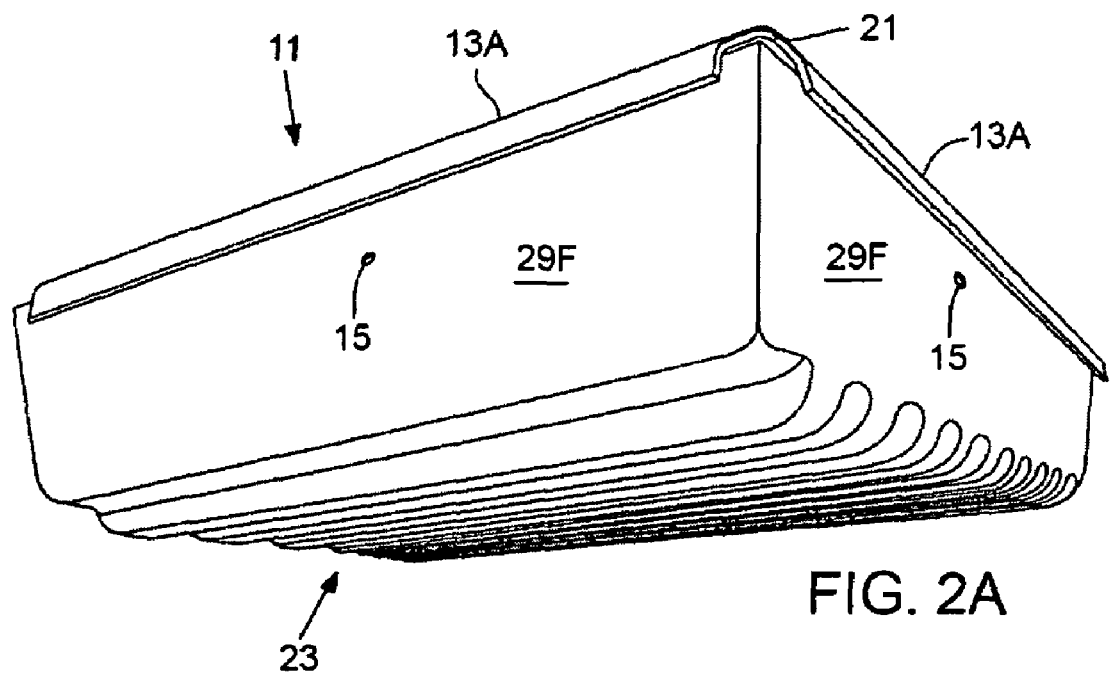
FIGS. 2A and 2B are perspective views of opposite sides of a tray for use in a green roof system of the invention.
Figure 2B:
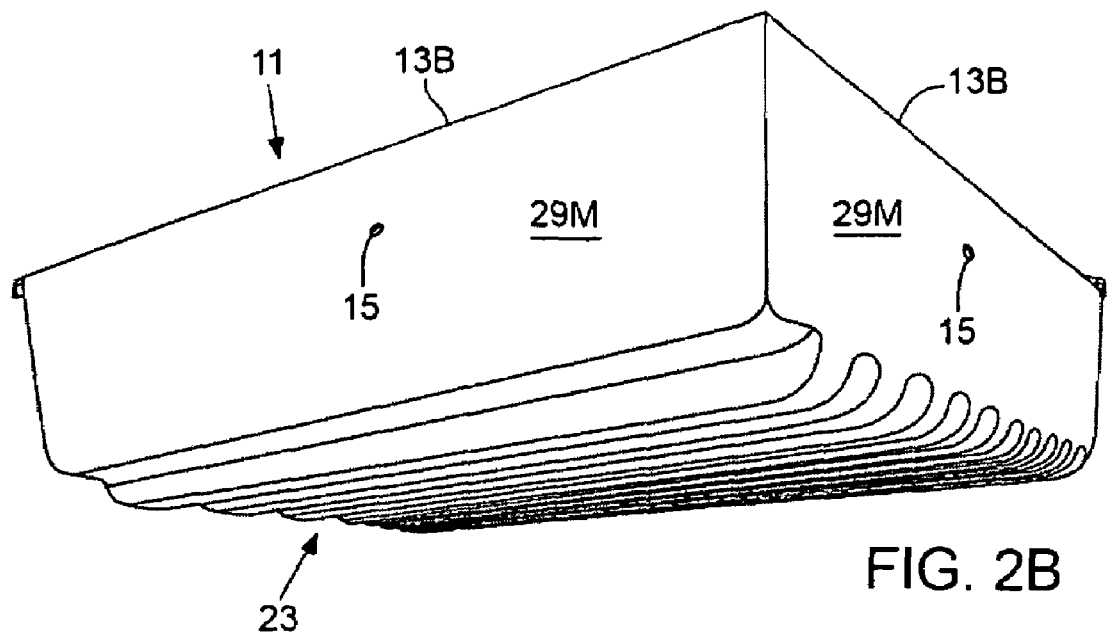

FIGS. 2A and 2B are perspective views of opposite sides of a tray for use in a green roof system of the invention.

Referring to FIGS. 2A and 2B, the trays 11 include a plurality of interconnecting lips 13. The interconnecting lips 13 may be a generally U-shaped edge 13A along a sidewall of a first tray configured to overlap a straight edge 13B along a sidewall of an adjacent tray. ("U-shaped" can include V-shaped.) As an example, a single tray 11 may be generally square in shape and have U-shaped edges 13A on two of its sidewalls. The sidewalls of the tray 11 that have the straight edges 13B may be referred to as male sidewalls 29M and the sidewalls that have the U-shaped edges 13A may be referred to as female sidewalls 29F. The U-shaped edges 13A on the female sidewalls of a tray 11 may be configured to receive the straight edges 13B of adjacent trays such that the U-shaped edges 13A overhang the straight edges 13B of the adjacent trays and extend inside the adjacent trays. Each square tray 11 may have two female sidewalls 29F which connect together about a notch 21 as shown in FIG. 2A. Opposite the female sidewalls 29F are two connected male sidewalls 29M. All of the sidewalls of the trays 11 may have connecting holes 15.

FIGS. 3 and 3A-C are cross-sectional views of a method for connecting trays of a green roof system according to an embodiment of the invention.

Referring to FIGS. 3 and 3A-C, a female sidewall 29F of a tray may be connected to a male sidewall 29M of an adjacent tray by positioning the edge of the female sidewall 29F so as to overlap the edge of the male sidewall 29M of the adjacent tray. As best shown in FIG. 3, the U-shaped edge 13A of the female sidewall 29F may extend inside the adjacent tray. The facing sidewalls of adjoining trays may be further secured together by the securing device 14. The securing device 14 may penetrate connecting holes 15 in the adjacent sidewalls of the adjacent trays. As an example, the securing device 14 may be a quick-lock fastener. The quick-lock fastener is inserted through the connecting holes 15 and then actuated to secure the adjacent trays 11 together. An example of a quick-lock fastener suitable for this application is a Fastex Tuflok™. In some cases, both the interconnecting lip 13 and the securing device 14 are used to secure adjacent trays together. This configuration may be referred to as a 'double locking system'. However, in some cases, the securing device 14 is not used, so that only the interconnecting lip 13 is used to secure adjacent trays together.

Figure 4:
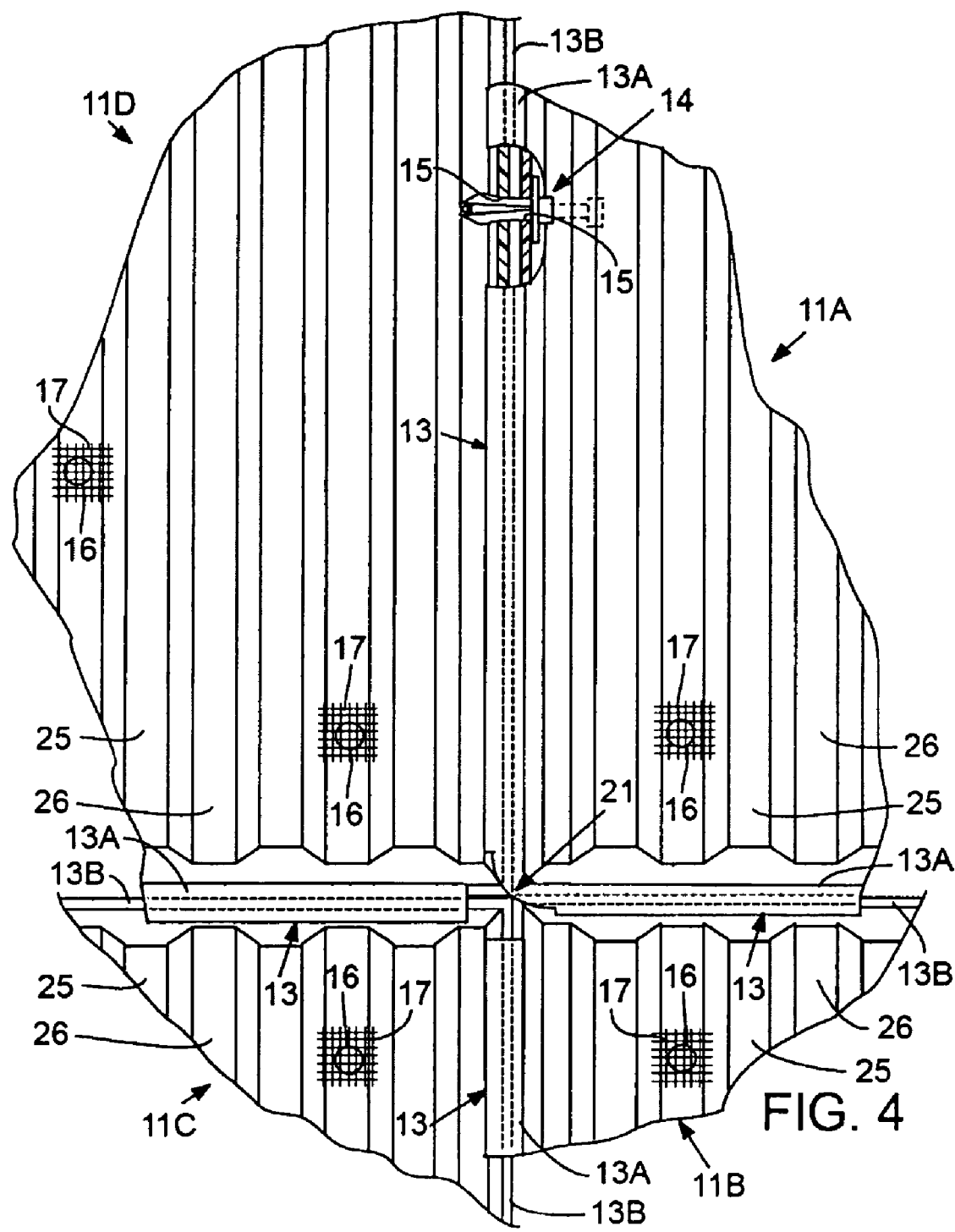
FIG. 4 is a partial plan view of several trays connected together in accordance with an embodiment of the invention.

FIG. 4 is a partial plan view of several trays connected together in accordance with an embodiment of the invention.

Referring to FIG. 4, four trays 11 are connected together as described with reference to FIG. 3 above. The trays 11A, 11B, 11C, and 11D are connected together in a grid-type configuration thereby allowing large portions of a roof structure to be covered by a system of interconnected trays. The notch 21 in the corner of tray 11A accommodates the male edges at the adjacent corners of trays 11B and 11D. Since an interconnecting lip 13 is used to secure each of the adjacent trays together, there is no gap between sidewalls of adjacent trays. Therefore, the roofing system of the invention provides better roof surface area utilization and coverage than conventional systems. The interconnecting lip design of the trays also prevents soil mixture from spilling in between adjacent trays, thereby preventing other problems associated with conventional systems. Further, the interconnecting lip design of the invention provides easy installation that does not require installation of screws or bolts.

Each of the trays 11 contains multiple drain holes 16, each having a drain hole cover 17. The drain hole cover 17 may be a screen for preventing the absorbent medium 12, or roots associated with the vegetation 18, from leaving the tray 11 through the drain hole 16.

Figure 5:
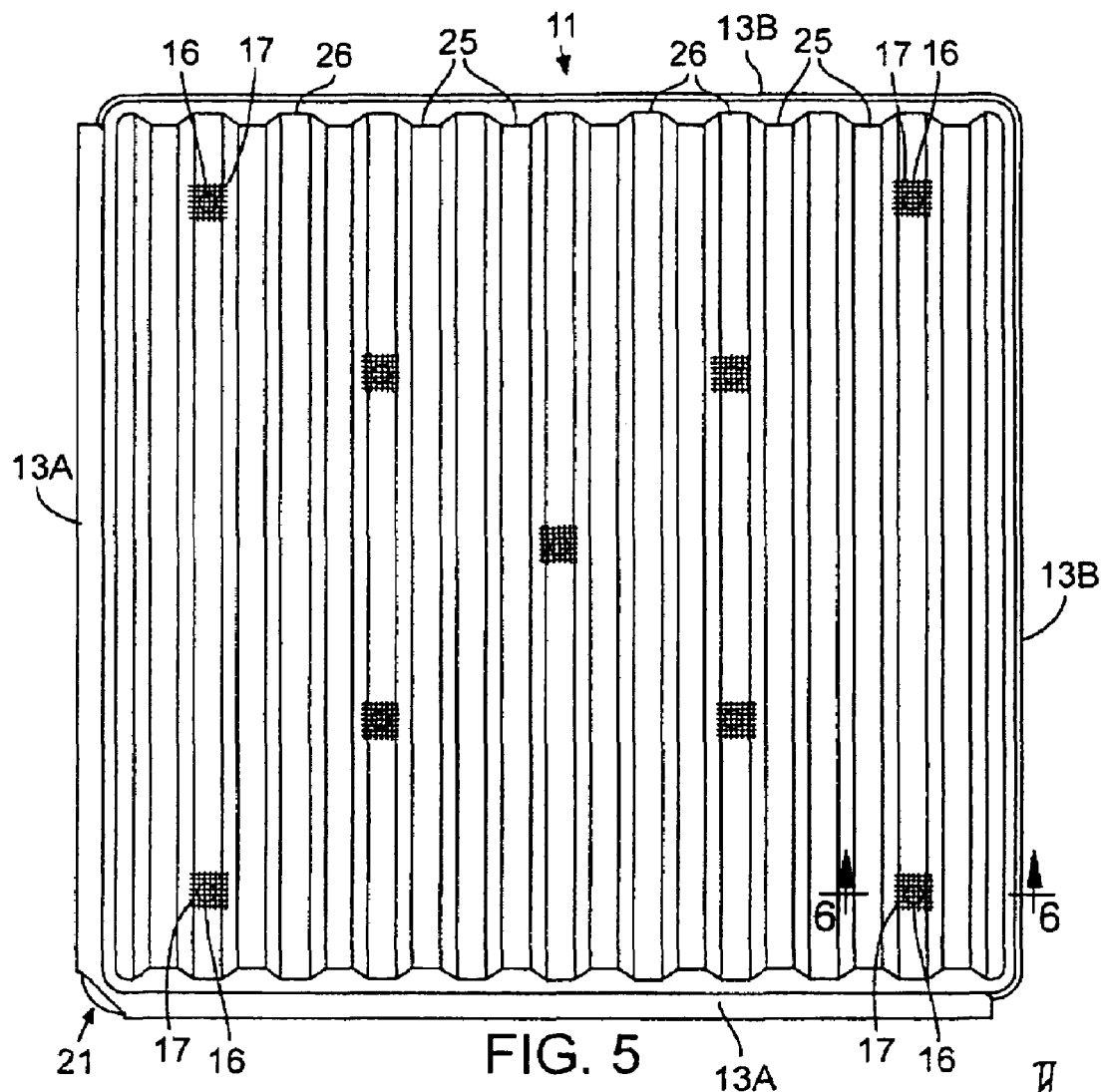
FIG. 5 is a plan view of a single tray illustrating drain holes in the tray and the arrangement of complementary interconnecting male and female edges.
Figure 6:
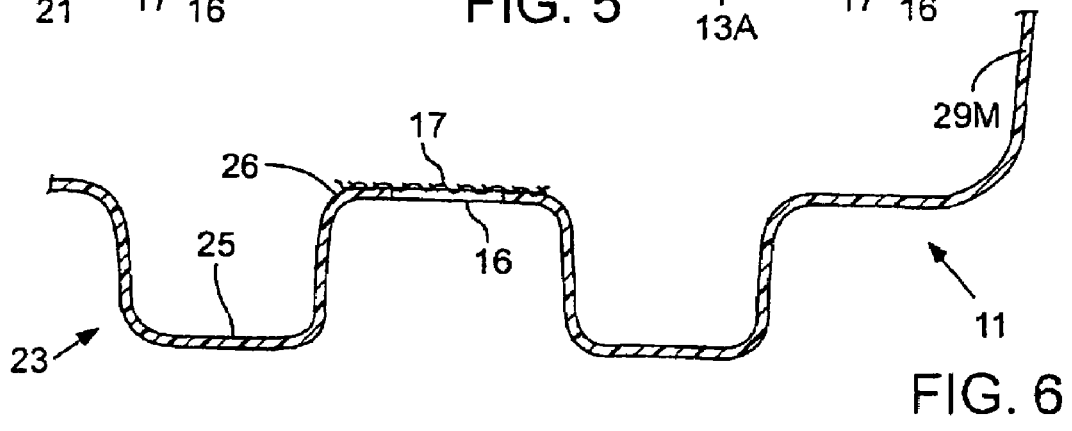
FIG. 6 is a partial cross-sectional view of the tray of FIG. 5 illustrating drain hole covers over the drain holes in the tray.

FIG. 5 is a plan view of a single tray illustrating drain holes in the tray and the arrangement of complementary interconnecting male and female edges. FIG. 6 is a partial cross-sectional view of the tray of FIG. 5 illustrating drain hole covers over the drain holes in the tray.

Referring to FIGS. 1, 5 and 6, each tray 11 comprises a corrugated bottom panel 23. The bottom panel 23 of each tray may be composed of eleven, parallel, raised ribs 26 and ten, parallel, recessed flutes 25. Some of the ribs 26 may have drain holes 16. The tray 11 may have nine drain holes 16 arranged in a 'St Andrews' cross-type pattern. Each drain hole 16 may have an approximately ⅜" diameter. The ribs 26 and flutes 25 may be ¾" in width. Each flute 26 may be approximately ⅝" deep. The purpose of the flutes 25 is to act as a cistern and store water to aid hydration of the growing media during extensive dry periods. See FIG. 1 showing retained water in the flutes. Other numbers, sizes, and arrangements of the drain holes 16, the ribs 26, and the flutes 25 are within the spirit and scope of the invention.

Referring to FIG. 6, a drain hole cover 17, as described above with respect to FIG. 4, covers each of the drain holes 16 in the tray 11. As an example, the drain hole cover 17 may be a mesh screen. The drain hole cover may be secured to the flute 25 over the drain hole 16 and may be made of any suitable material including copper, stainless steel, or another metal or metal alloy or a polymeric or glass fiber mesh. The drain hole cover 17 may be secured to the flute 26 over the drain hole 16 using a glue or adhesive material. Alternatively, the drain hole cover 17 may be molded into the flute 25 over the drain hole 16. For example, a drain hole cover 17 may be placed into an injection mold so that when the tray 11 is manufactured, the drain hole cover 17 is integrally molded into the tray. According to preferred embodiments, the drain hole cover 17 is a mesh screen made of 0.011" copper or stainless steel wire or other mesh material and is molded into the tray 11.

FIGS. 7 and 7A-C are cross-sectional views illustrating trays connected together according to an alternative embodiment of the invention.

Referring to FIGS. 7 and 7A-C, the sidewalls of the trays 11 may include a protruded portion 27 downwardly adjacent to lip 13 along the upper edge thereof. The protruded portion 27 may be a rounded protrusion or bulge extending inwardly from the plane of the sidewalls of the tray 11. Adjacent trays are positioned such that the interconnecting lip 13 of the female sidewall 29F of a first tray overlaps the male sidewall 29M of a second tray. Then, a U-shaped spring clip 28 may be installed over the interconnecting lip 13 so as to engage with the protruded portions 27 and thereby secure the adjacent trays together.

Figure 8:
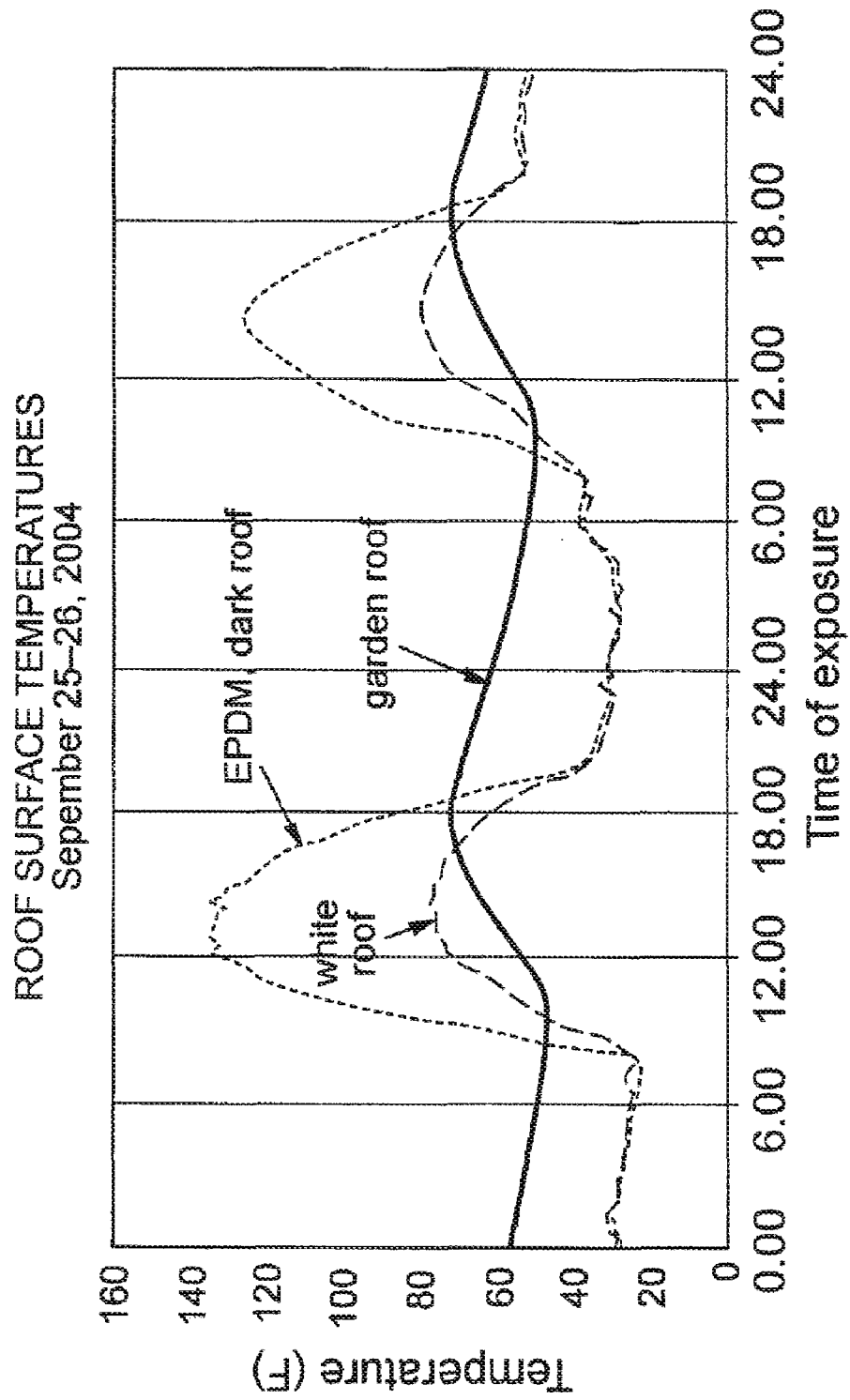
FIG. 8 is a plot of roof surface temperatures corresponding to various types of roof coverings.

FIG. 8 is a plot of roof surface temperatures corresponding to various types of roof coverings, from A. Dürr, Roof Greening: An Ecological Balance (1995), republished in U.S. Department of Energy, Federal Technology Alert Publication DOE/EE-0298, September 2004.

As shown in FIG. 8, when the invention is utilized, the roof surface temperature varies only about 25 degrees over a 48-hour period. However, when conventional roof coverings are used, the roof surface temperature varies between about 50 and 110 degrees, depending on the type of roof covering used. Consequently, roof coverings in accordance with the invention can provide significant energy savings by minimizing the variation of roof surface temperature and the corresponding temperature inside a building.

Figure 9:
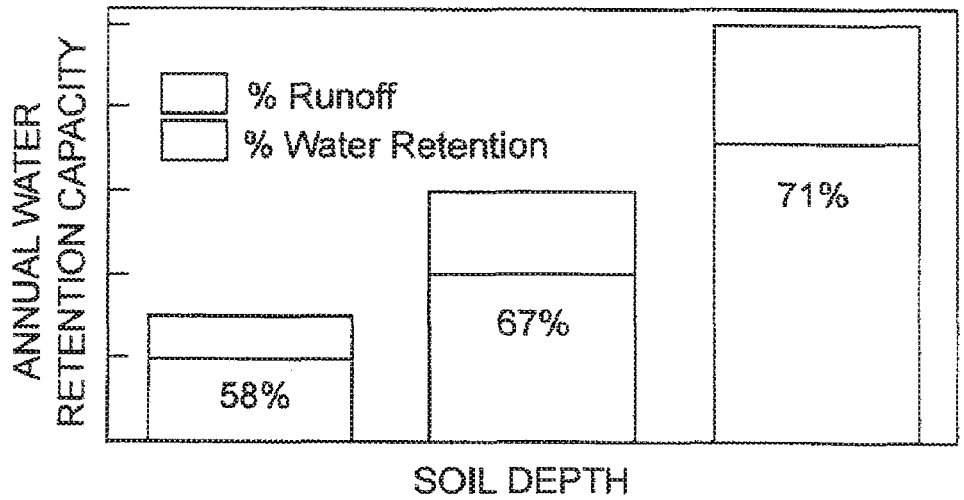
FIG. 9 is a plot of water retention corresponding to various depths of soil.

FIG. 9 is a plot of water retention corresponding to various depths of soil, from A. Dürr.

As shown in FIG. 9, increased soil depth leads to improved water retention capabilities. When the trays of the invention are manufactured with the standard depth of 4⅝", the water retention of the trays corresponds to the 71% data point on the graph. Conventional methods with less soil depth have significant reduction in water retention as shown by the 58% and 67% data points in the graph.

Figure 10:
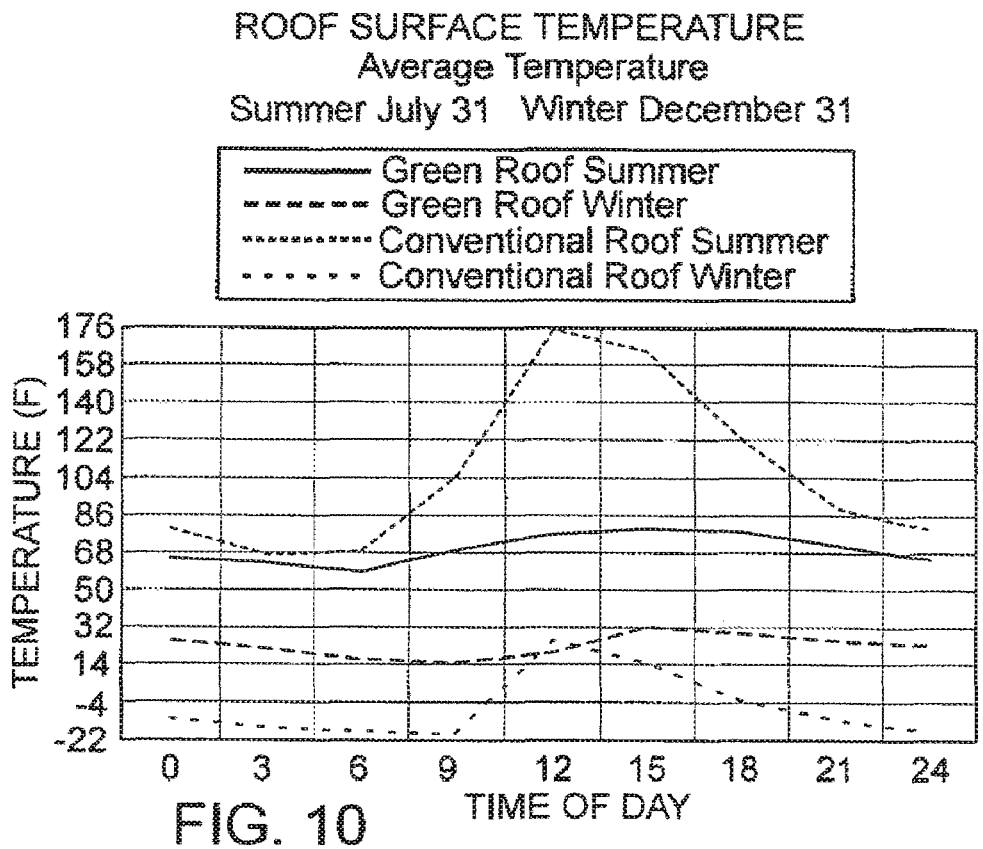
FIG. 10 is a plot of roof surface temperatures in the summer and winter corresponding to conventional roof coverings and roof coverings in accordance with embodiments of the invention.

FIG. 10 is a plot from A. Dürr of roof surface temperatures in the summer and winter corresponding to conventional roof coverings and green roof coverings in general, per A. Dürr.

As shown in FIG. 10, during the summer, the roof surface temperature of a roof employing the invention only varies about 20 degrees over a 24-hour period. In contrast, the roof surface temperature of a roof employing a conventional roof covering varies about 100 degrees over a 24-hour period in the summer. During the winter, the roof surface temperature of a roof employing the invention also only varies about 20 degrees over a 24-hour period. The roof surface temperature of a roof employing a conventional roof covering varies about 50 degrees under the same conditions.

As described above, the interlocking tray system of the invention provides gap-less coverage of roof surfaces without installation of screws or bolts. This allows better roof surface area utilization and prevents the adverse effects of soil mixture spillage between adjacent trays. Utilizing the green roof system of the invention, water retention can be maximized and roof surface temperature variation can be minimized. Consequently, the green roof system of the invention provides reduced energy costs, reduced runoff during rainy periods, and environmental advantages, such as increased green space in commercial or other populated areas. Buildings employing the green roof system of the invention may also realize reduced noise pollution due to the sound-dampening qualities of the vegetation and the absorbent medium in the trays.

Figure 11:
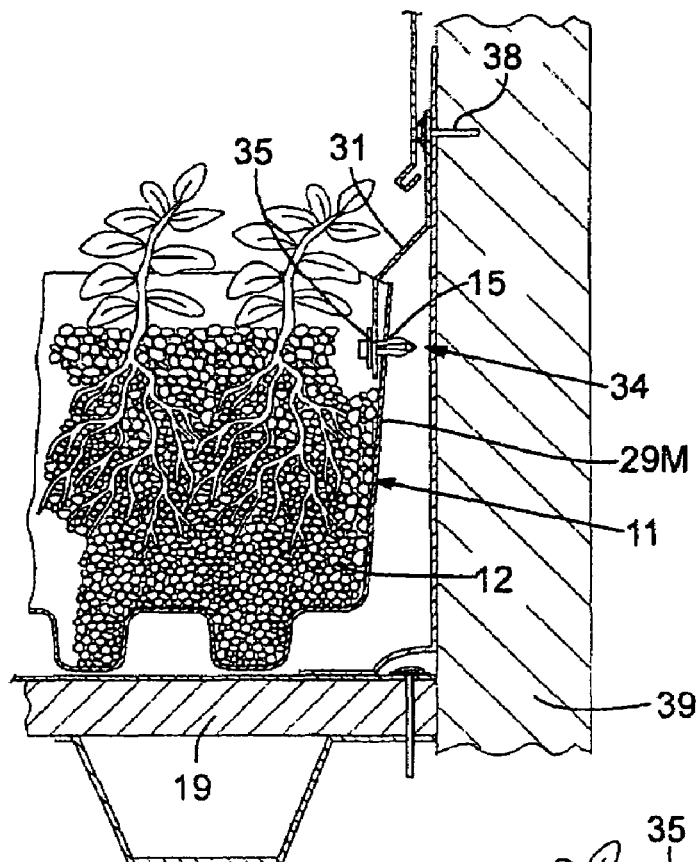
FIG. 11 is a cross-sectional view of an interlocking tray system including wall anchor flashing interlocked with a male tray sidewall.
Figure 12:
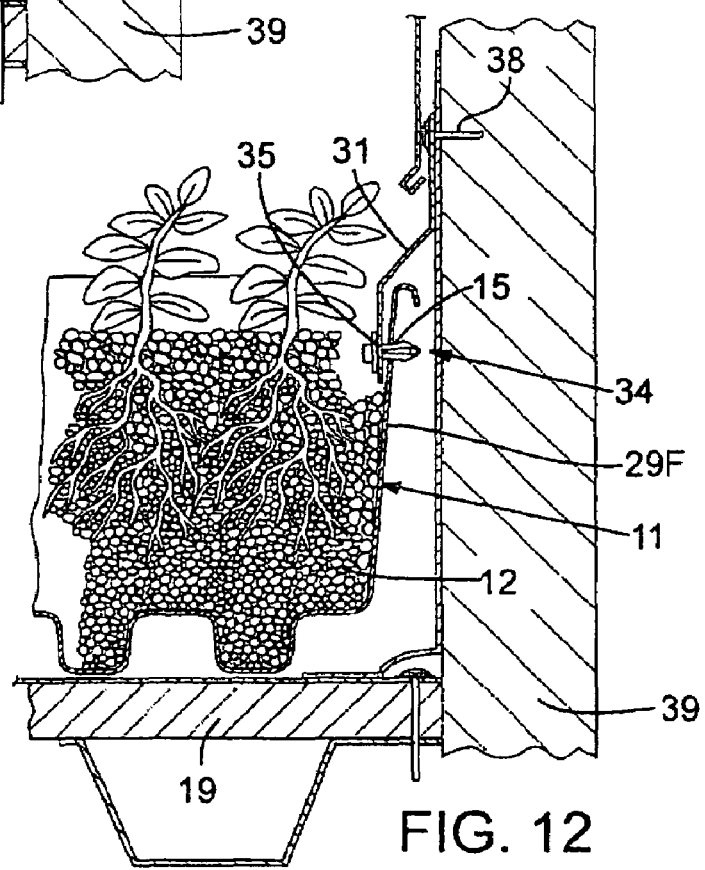
FIG. 12 is a cross-sectional view of an interlocking tray system including wall anchor flashing interlocked with a female tray sidewall.

FIG. 11 is a cross-sectional view of an interlocking tray system including wall anchor flashing interlocked with a male tray sidewall. FIG. 12 is a cross-sectional view of an interlocking tray system including wall anchor flashing interlocked with a female tray sidewall.

Referring to FIGS. 11 and 12, an interlocking tray system according to an embodiment of the invention includes a wall anchor flashing 31. The wall anchor flashing 31 may be secured to a parapet wall 39 using a fastener 38. The wall anchor flashing 31 overhangs a male sidewall 29M (FIG. 11) or a female sidewall 29F (FIG. 12) of a tray 11. The wall anchor flashing 31 may include a connecting hole 35 and a securing device 34. The securing device 34 penetrates the connecting hole 35 in the wall anchor flashing 31 and the corresponding connecting hole 15 in the tray 11 to secure the wall anchor flashing 31 to the tray 11.

Figure 13:
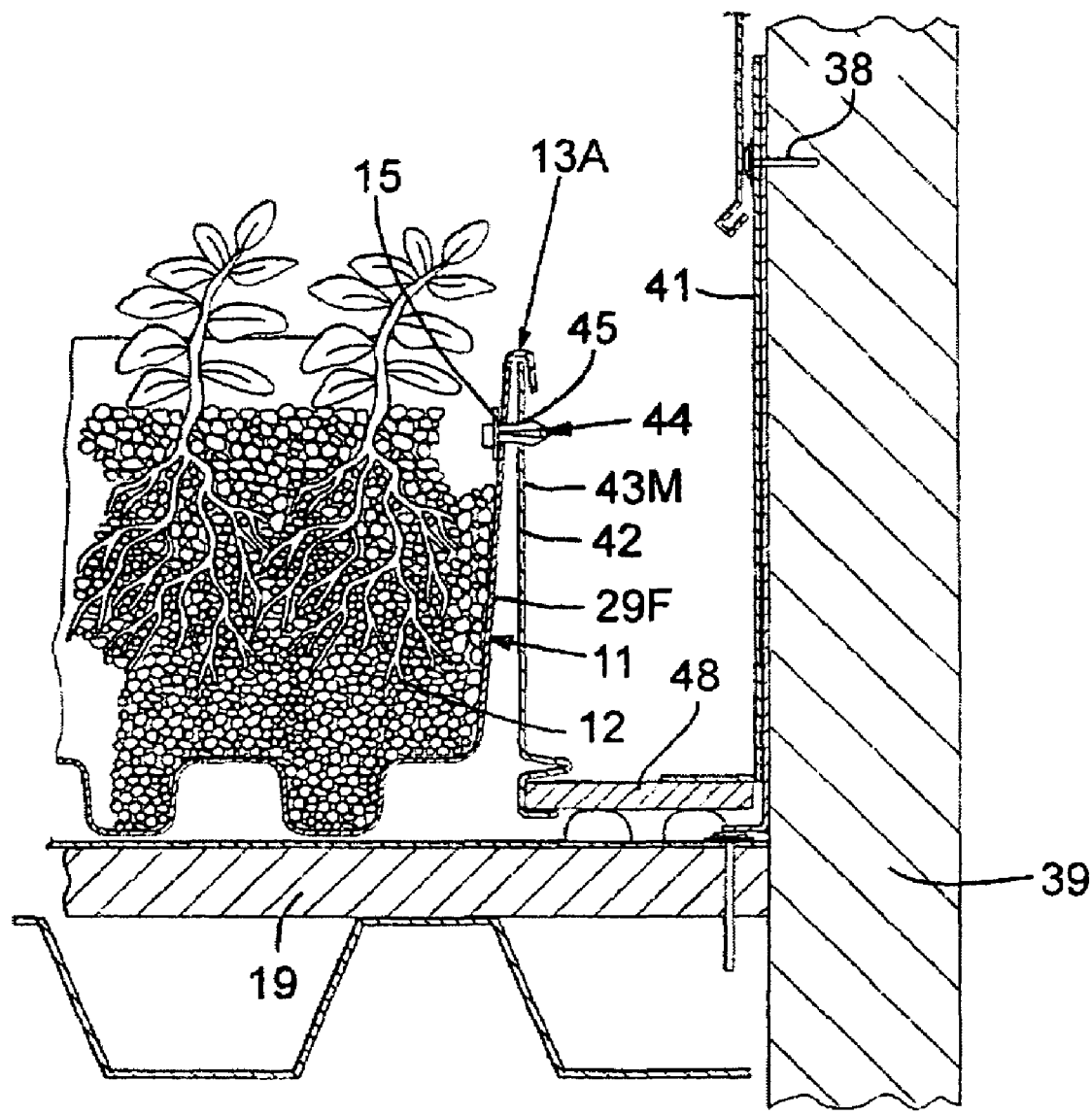
FIG. 13 is a cross-sectional view of an interlocking tray system including walk pad trim flashing interlocked with a female tray sidewall.
Figure 14:
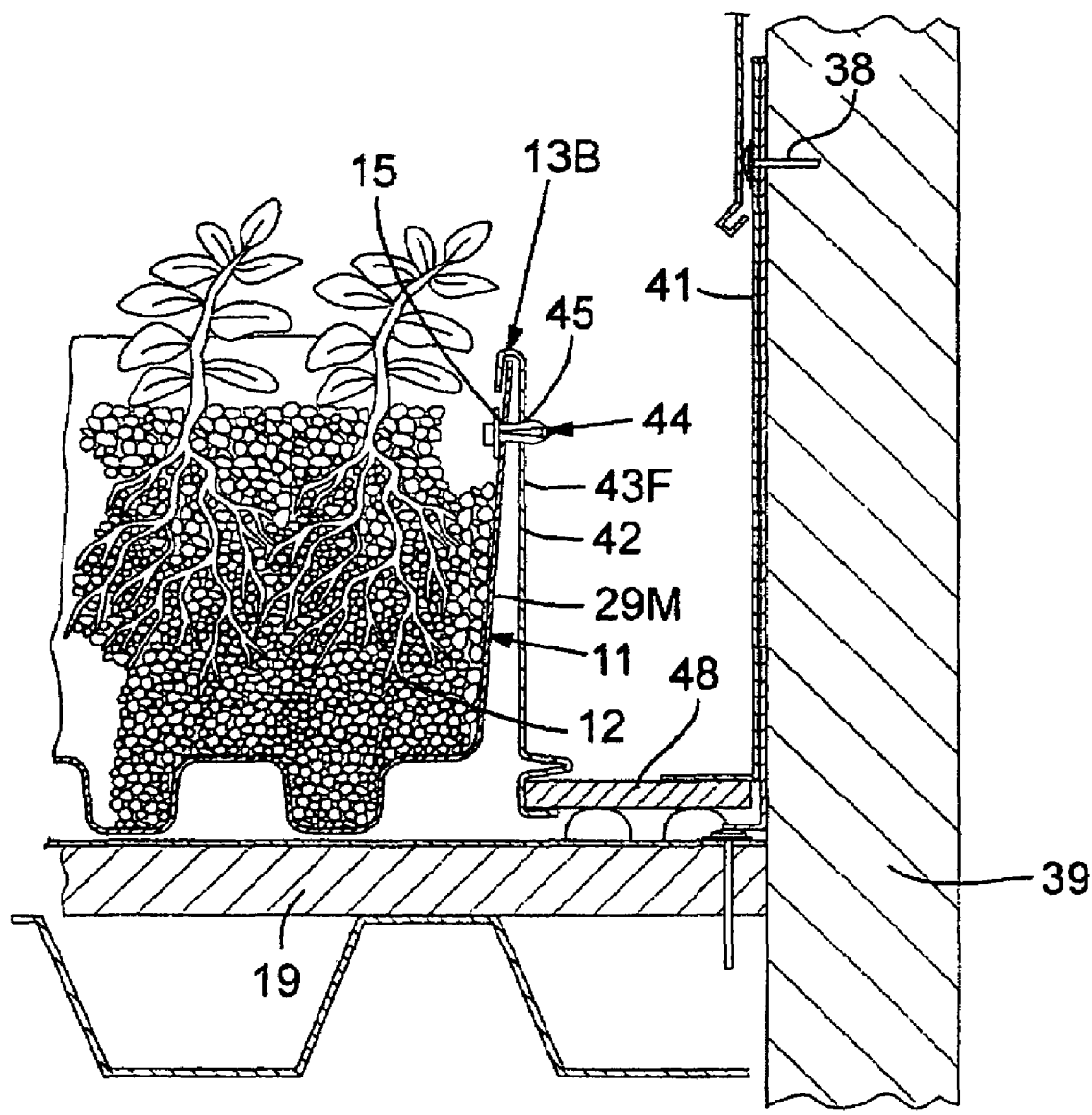
FIG. 14 is a cross-sectional view of an interlocking tray system including walk pad trim flashing interlocked with a male tray sidewall.

FIG. 13 is a cross-sectional view of an interlocking tray system including walk pad trim flashing interlocked with a female tray sidewall. FIG. 14 is a cross-sectional view of an interlocking tray system including walk pad trim flashing interlocked with a male tray sidewall.

Referring to FIGS. 13 and 14, an interlocking tray system according to an embodiment of the invention includes a walk pad wall flashing 41, a walk pad 48, and a walk pad trim flashing 42. The walk pad wall flashing 41 may be secured to a parapet wall 39 using a fastener 38. As shown in FIG. 13, a male edge 43M of the walk pad trim flashing 42 interlocks with a U-shaped edge 13A of a female sidewall 29F of a tray 11. As shown in FIG. 14, a female edge 43F of the walk pad trim flashing 42 interlocks with a straight edge 13A of a male sidewall 29M of a tray 11. The walk pad trim flashing 42 may include a connecting hole 45 and a securing device 44. The securing device 44 penetrates the connecting hole 45 in the walk pad trim flashing 42 and the corresponding connecting hole 15 in the tray 11 to secure the walk pad trim flashing 42 to the tray 11.

Figure 15:
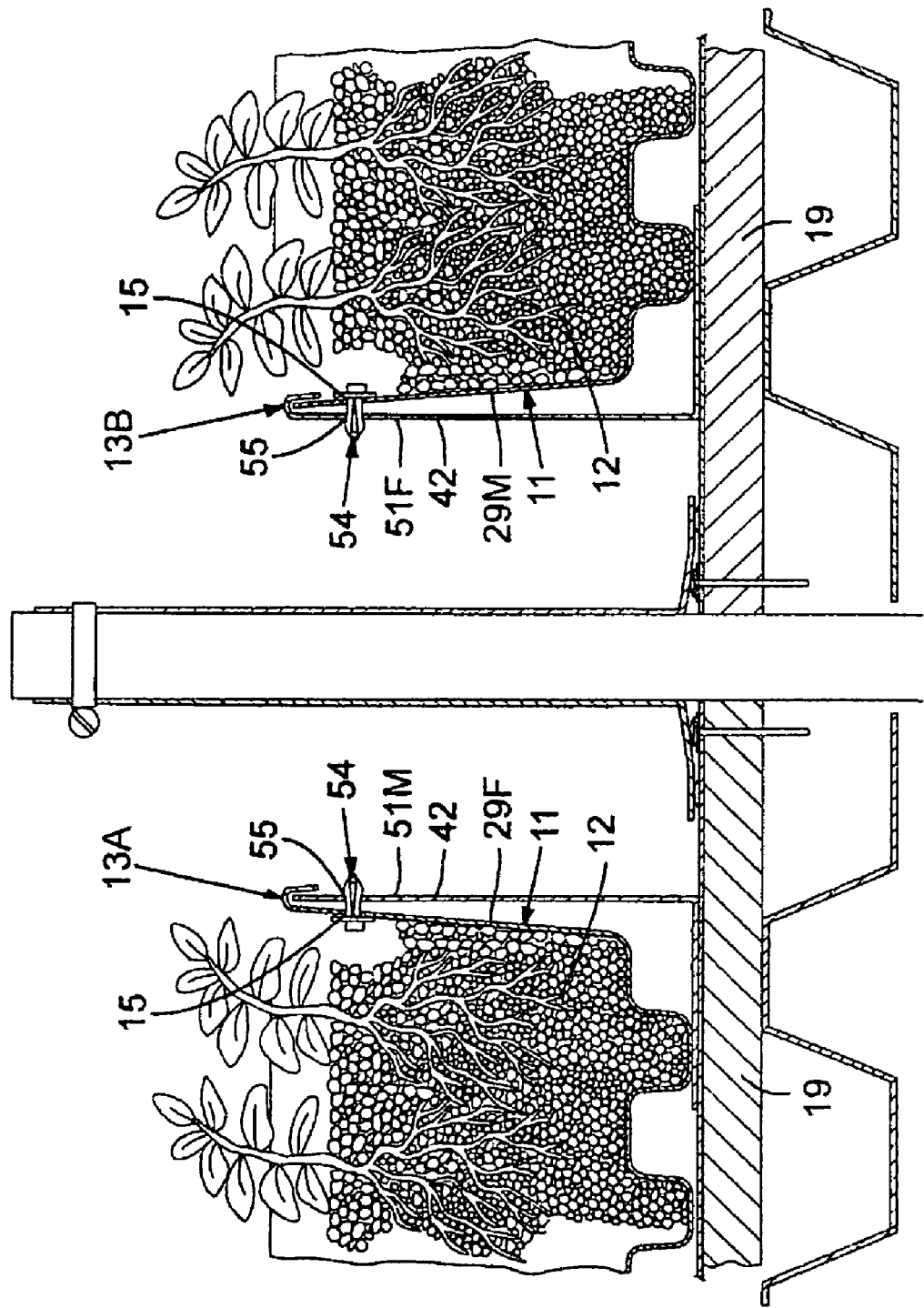
FIG. 15 is a cross-sectional view of an interlocking tray system including male and female tray edges.

FIG. 15 is a cross-sectional view of an interlocking tray system including male and female tray edges.

Referring to FIG. 15, an interlocking tray system according to an embodiment of the invention includes a male tray edge 51M and/or a female tray edge 51F. The male tray edge 51M interlocks with a U-shaped edge 13A of a female sidewall 29F of a tray 11. The female tray edge 51F interlocks with a straight edge 13B of a male sidewall 29M of a tray 11. The male and female tray edges, 51M and 51F, may each include a connecting hole 55 and a securing device 54. The securing device 54 penetrates the connecting hole 55 and the corresponding connecting hole 15 in the tray 11 to secure the male and female tray edges, 51M and 51F, to the tray 11.

FIGS. 11 through 15 illustrate embodiments of the invention for securing an interlocking tray system to various rooftop elements such as HVAC components, parapet walls, and vents. Securing the interlocking tray system to the rooftop elements allows the system to integrate with existing rooftop configurations and prevents wind uplift from displacing and/or damaging trays.

FIGS. 16A and 16B are plan and cross-sectional views, respectively, of a hose gap according to some embodiments of the invention.

Referring to FIGS. 16A and 16B, a female sidewall 29F of a tray 11 can include a hose gap 30. The hose gap 30 can be an indentation from the substantially flat top surface of the female sidewall 29F. The hose gap 30 is configured to allow an irrigation hose to lay across the edge of the tray. The hose gap 30 can be disposed above the connecting hole 15 so that a hook can be used to retain an irrigation hose in the hose gap 30, as described below with respect to FIGS. 19 and 20. The hose gap 30 may have a width of approximately ⅝" and a height of approximately ⅝" from the top of the female sidewall 29F. The hose gap 30 can have a substantially semi-circular bottom so that an irrigation hose can be supported in the hose gap 30.

FIGS. 17A and 17B are plan and cross-sectional views, respectively, of adjacent trays according to some embodiments of the invention.

Referring to FIGS. 17A and 17B, a male sidewall 29M of a tray 11 can also include a hose gap 30. The hose gap 30 can be an indentation from the substantially flat top surface of the male sidewall 29M. When a male sidewall 29M and a female sidewall 29F are joined, corresponding hose gaps 30 are aligned so that an irrigation hose can be disposed in the hose gaps 30 of adjacent trays 11.

FIG. 18 is a plan view of a hose retaining hook according to some embodiments of the invention.

Referring to FIG. 18, a hose retaining hook 40 includes a mounting portion 42, a mounting hole 44, and a hook portion 46. The mounting portion 42 can be placed against the female sidewall 29F of a tray 11 such that the mounting hole 44 is aligned with the connecting hole 15. A securing device 14 can then be used to secure the retaining hook 40 to the tray 11 when adjacent trays 11 are joined together, as described above with respect to FIGS. 3 and 3A-C. The hook portion 46 can be positioned such that an irrigation hose is retained between the hook portion 46 and the hose gaps 30 of adjacent trays 11.

Figure 20:
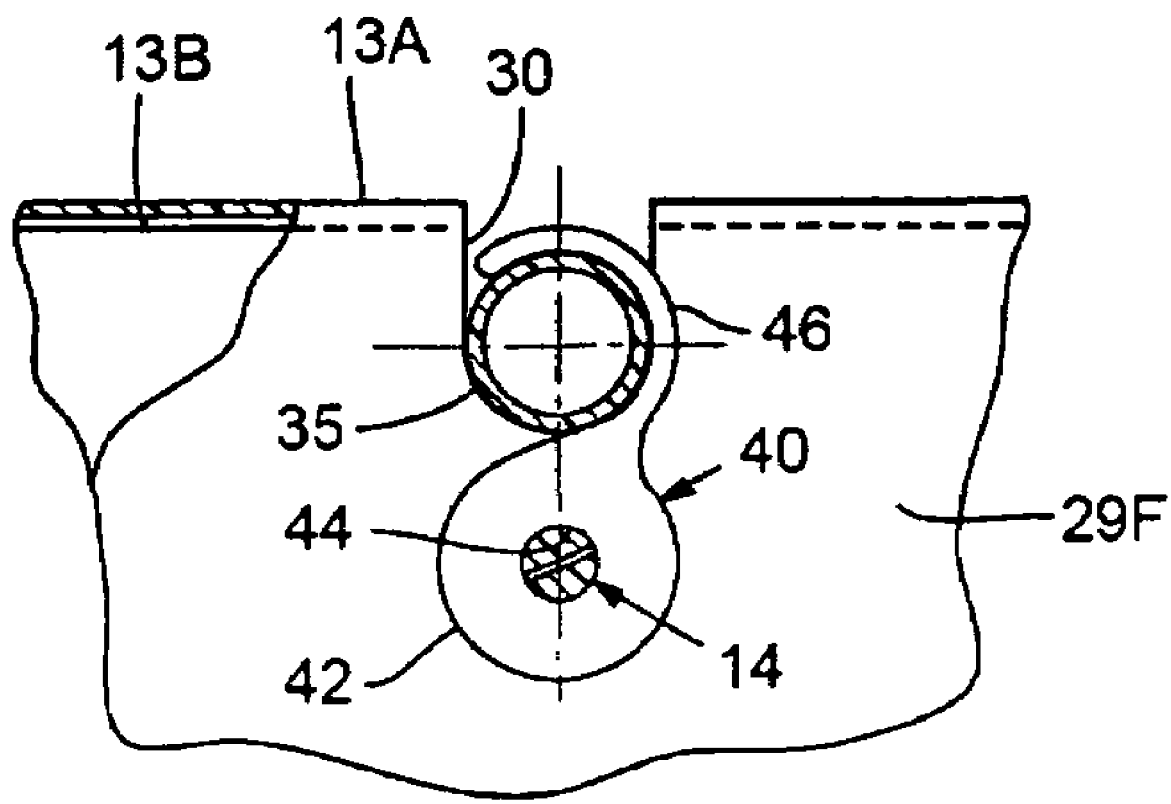

FIGS. 19 and 20 are mutually orthogonal cross-sectional views of two joined trays according to some embodiments of the invention.

Referring to FIGS. 19 and 20, two trays 11 may be joined together by a securing device 14 as described above with respect to FIGS. 3 and 3A-C. The two trays 11 each include a hose gap 30 and the hose gaps 30 are aligned with each other. An irrigation hose 35 is disposed across the two trays 11 and in the hose gaps 30. The irrigation hose 35 includes a plurality of drip emitters 37. The drip emitters 37 may be spaced apart along the irrigation hose 35 at approximately 4" to 12" intervals. A hose retaining hook 40 engages the irrigation hose 35 and retains the irrigation hose 35 in the hose gaps 30. The securing device 14 penetrates the hose retaining hook 40 and holds the hose retaining hook 40 securely to the female side 29F of the tray 11.

Figure 21A:
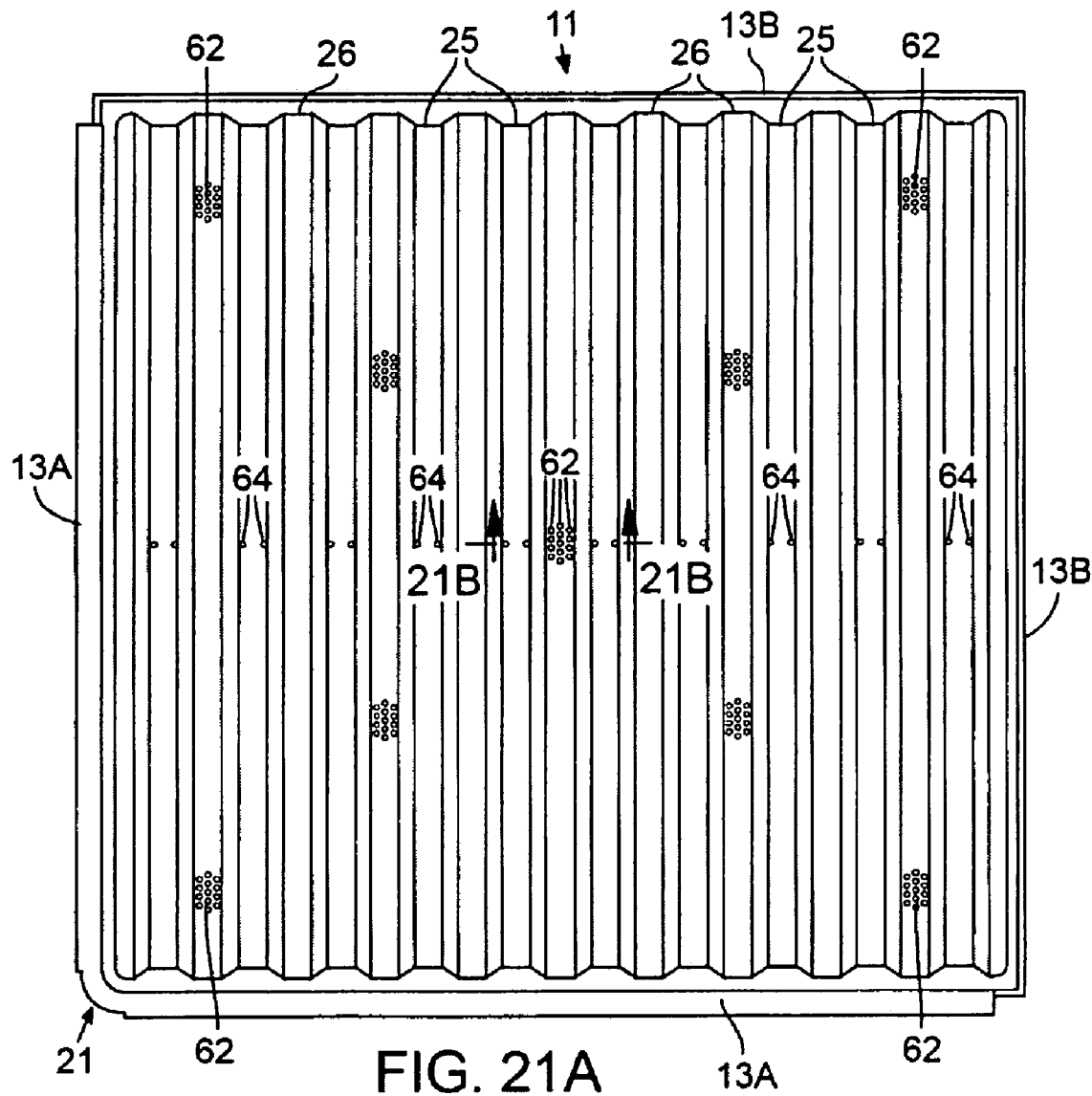
FIGS. 21A and 21B are plan and partial cross-sectional views, respectively, of a tray illustrating drain holes according to some embodiments of the invention.
Figure 21B:
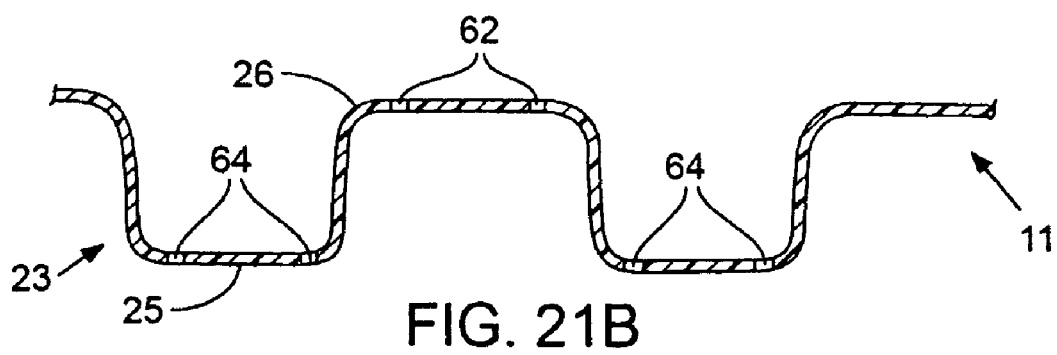

FIGS. 21A and 21B are plan and partial cross-sectional views, respectively, of a tray illustrating drain holes according to some embodiments of the invention.

Referring to FIGS. 21A and 21B, a bottom panel 23 of a tray 11 may include a plurality of raised ribs 26 and recessed flutes 25. One or more of the raised ribs 26 may include a drain hole array 62. The drain hole array 62 may comprise 13 equally-spaced drain holes arranged in a regular pattern. The drain holes in the drain hole array 62 may be circular holes with a diameter of approximately 1/16".

Additionally, one or more of the recessed flutes 25 may include a root drain hole 64. The root drain hole 64 may be substantially circular with a diameter of approximately 1/16". The bottom panel 23 may include a plurality of root drain holes 64 positioned along a centerline of the tray 11. The root drain holes 64 may be disposed approximately ⅛" from each of the raised ribs 26. Alternatively, the root drain holes 64 may be disposed next to only some of the raised ribs 26 (for instance, one root drain hole 64 may be disposed in each of the recessed flutes 25. The root drain holes 64 may be configured so as to prevent excessive water accumulation in the recessed flutes 25 from causing root rot or other damage to vegetation in the tray 11.

Depending on the surface area that is to be covered by a vegetation roofing system, it may be difficult to use a whole number of trays 11 to cover the area. In this case, it may be desirable to trim a number of trays 11 to match the area to be covered. Consequently, end caps can be used to close off the ends of the trimmed or partial trays so that vegetation can be retained in the partial trays and the appropriate drain conditions can be maintained.

Depending on the configuration of the vegetation roofing system, it may be desirable to trim some trays perpendicular to the raised ribs in the bottom panel and to trim some trays parallel to the raised ribs. For example, if trays are arranged such that the raised ribs of adjacent trays are perpendicular to each other, when several trays along a side of the vegetation roofing system are trimmed, the resulting partial trays will alternate being perpendicular and parallel with the raised ribs. Therefore, end caps can be provided to accommodate partial trays that are trimmed parallel to the raised ribs and end caps to accommodate partial trays that are trimmed perpendicular to the raised ribs.

FIGS. 22A and 22B are cross-sectional views of perpendicular end caps according to some embodiments of the invention.

Referring to FIGS. 22A and 22B, a perpendicular end cap 70 includes a vertical side panel 72, a connecting lip 73, a plurality of raised portions 76, and a plurality of recessed portions 78. The connecting lip 73 may be either a generally U-shaped edge or a straight edge, similar to the connecting lips 13 described above with respect to FIGS. 2A and B. One or more of the raised portions 76 may be secured to a partial tray 11P by a securing device 74.

FIGS. 23A and 23B are cross-sectional views of parallel end caps according to some embodiments of the invention.

Referring to FIGS. 23A and 23B, a parallel end cap 80 includes a vertical side panel 82, a connecting lip 83, a horizontal member 86, and a trough 88. The connecting lip 83 may be either a generally U-shaped edge or a straight edge, similar to the connecting lips 13 described above with respect to FIGS. 2A and B. The horizontal member 86 may be secured to a partial tray 11P by a securing device 84.

Figure 24:
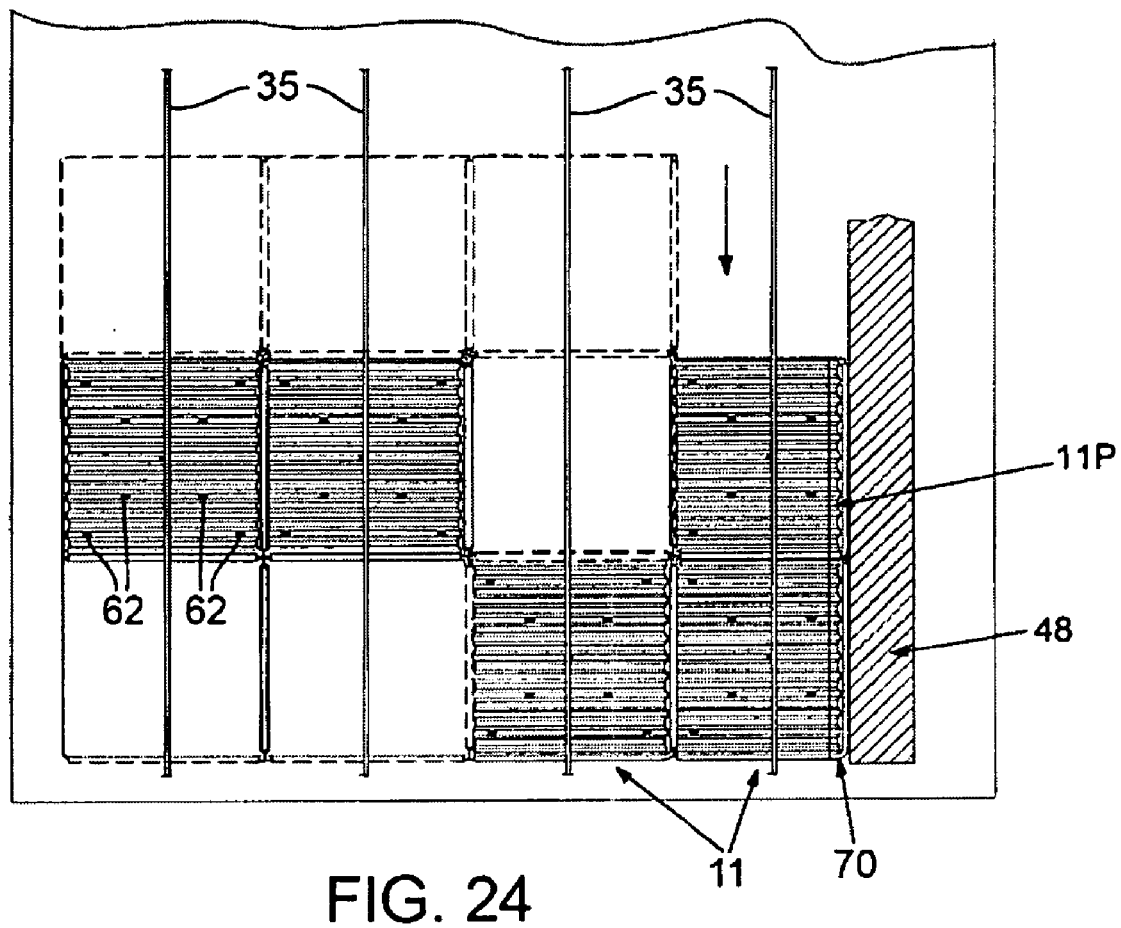
FIG. 24 is a plan view of a vegetation roofing system according to some embodiments of the invention.

FIG. 24 is a plan view of a vegetation roofing system according to some embodiments of the invention.

Referring to FIG. 24, a vegetation roofing system includes a plurality of trays 11, a plurality of irrigation hoses 35, and a walk pad 48. The trays 11 may include some partial trays 11P and end caps as described above with respect to FIGS. 22A-23B. As an example, the vegetation roofing system is shown as including perpendicular end caps 70 connected to partial trays 11P. The irrigation hoses 35 extend across multiple trays 11 and are supported in the hose gaps 30 of the trays. The trays 11 may include hose retaining hooks 40 to secure the irrigation hoses 35 in place. The trays 11 may also include drain hole arrays 62 and root drain holes 64.

The foregoing is illustrative of the invention and is not to be construed as limiting thereof. Although a few example embodiments of the invention have been described, those skilled in the art will readily appreciate that many modifications are possible in the example embodiments without materially departing from the novel teachings and advantages of the invention. For example, the trays could be hexagonal, with alternating male and female sidewalls. Accordingly, all such modifications are intended to be included within the scope of the invention as defined in the following claims.

The invention claimed is:

1. A vegetation roofing tray, comprising:
a bottom panel;
at least four vertical side panels; and
at least one drain hole;
wherein two of the vertical side panels include a U-shaped upper edge and two of the vertical side panels include a straight upper edge mutually arranged so that the straight upper edge can be received in the U-shaped upper edge of an adjacent tray,
wherein at least one of the U-shaped upper edges and at least one of the straight upper edges comprise a U-shaped hose gap formed in the upper edges of the side panels; and
a hose retaining hook coupled to at least one of the vertical side panels in position to retain an irrigation hose in the U-shaped hose gap along the upper edges of the side panels.

2. The tray of claim 1, wherein at least two of the vertical side panels comprise a connecting hole and wherein the connecting holes are disposed below the hose gaps, the retaining hook coupled to a securing device received in one of the connecting holes.

3. The tray of claim 1, wherein the bottom panel comprises:
a plurality of raised ribs; and
a plurality of recessed flutes.

4. The tray of claim 3, wherein the at least one drain hole comprises a drain hole array disposed on at least one of the raised ribs.

5. The tray of claim 3, wherein the at least one drain hole comprises at least one root drain hole disposed in at least one of the recessed flutes.

6. The tray of claim 1, further comprising an absorbent medium and vegetation.

7. The tray of claim 6, wherein the absorbent medium includes a soil mixture and an absorbent material.

8. A vegetation roofing system, comprising:
a first tray; and
a second tray adjacent to the first tray;
each of the first tray and the second tray including:
a bottom panel;
a plurality of vertical side panels, wherein at least one of the vertical side panels includes a hose gap; and
at least one drain hole,
wherein an interconnecting lip couples adjacent vertical side panels of the first and second trays such that the hose gap of the first tray corresponds to the hose gap of the second tray;
an irrigation hose at least partially disposed in the hose gaps of the first and second trays;
a securing device penetrating adjacent connecting holes of the first and second trays, wherein the connecting holes are disposed below the hose gaps; and
a hose retaining hook, wherein the securing device penetrates the hose retaining hook and the hose retaining hook is configured to engage the irrigation hose.

9. The system of claim 8, wherein the bottom panels of the first and second trays comprise:
a plurality of raised ribs; and
a plurality of recessed flutes.

10. The system of claim 9, wherein the drain holes in the first and second trays comprise a drain hole array disposed on at least one of the raised ribs.

11. The system of claim 9, wherein the drain holes in the first and second trays comprise at least one root drain hole disposed in at least one of the recessed flutes.

12. The system of claim 8, further comprising:
a partial tray adjacent to one of the first and second trays; and
at least one end cap.

13. The system of claim 12, wherein the end cap comprises a vertical side panel including a U-shaped upper edge.

14. The system of claim 12, wherein the end cap comprises a vertical side panel including a straight upper edge.

15. A vegetation roofing system, comprising:
a first tray; and
a second tray adjacent to the first tray;

each of the first tray and the second tray including:
  a bottom panel;
  a plurality of vertical side panels, wherein at least one of the vertical side panels include a hose gap; and
  at least one drain hole,
wherein an interconnecting lip couples adjacent vertical side panels of the first and second trays such that the hose gap of the first tray corresponds to the hose gap of the second tray;
an irrigation hose at least partially disposed in the hose gaps of the first and second trays;
a partial tray adjacent to one of the first and second trays; and
at least one end cap wherein the end cap comprises;
a vertical side panel; and
a plurality of recessed portions; and
a plurality of raised portions, wherein at least one of the raised portions is attached to a raised rib of the partial tray by a securing member.

16. A vegetation roofing system, comprising:
a first tray; and
a second tray adjacent to the first tray;
each of the first tray and the second tray including:
  a bottom panel;
  a plurality of vertical side panels, wherein at least one of the vertical side panels include a hose gap; and
  at least one drain hole,
wherein an interconnecting lip couples adjacent vertical side panels of the first and second trays such that the hose gap of the first tray corresponds to the hose gap of the second tray;
an irrigation hose at least partially disposed in the hose gaps of the first and second trays;
a partial tray adjacent to one of the first and second trays; and
at least one end cap wherein the end cap comprises:
a vertical side panel;
a trough; and
a horizontal member, wherein the horizontal member is attached to a raised rib of the partial tray by a securing member.

* * * * *